United States Patent [19]
Tregay

[11] 4,151,562
[45] Apr. 24, 1979

[54] METHODS AND APPARATUS FOR TRANSMITTING IMAGE DATA

[76] Inventor: John L. Tregay, 46 Old Hyde Rd., Weston, Conn. 06883

[21] Appl. No.: 871,937

[22] Filed: Jan. 24, 1978

Related U.S. Application Data
[63] Continuation-in-part of Ser. No. 550,864, Feb. 18, 1975.

[51] Int. Cl.² .............................................. H04H 7/12
[52] U.S. Cl. .................................... 358/260; 358/261; 358/263
[58] Field of Search ................ 358/133, 134, 135, 136, 358/260, 261, 263

[56] References Cited
U.S. PATENT DOCUMENTS
3,504,112 3/1970 Gruenberg ........................... 358/133

Primary Examiner—Robert L. Richardson
Assistant Examiner—Edward L. Coles
Attorney, Agent, or Firm—William G. Rhines

[57] ABSTRACT

This invention relates to information transmission systems and in one embodiment comprises apparatus and methods for generating facsimile signals that are compatible with devices in general use for sequential printing of alphanumeric characters, whereby the number of data bits required to transmit such facsimile signals may be reduced, and facsimile images or alphanumeric images may be printed interchangeably in sequence from the same data stream.

15 Claims, 24 Drawing Figures

Fig. 9

Code Group Redundancy Code List

| CODE NAME | CODE GROUP REDUNDANCY CODE LIST | | | | |
|---|---|---|---|---|---|
| UNCODED | 0 | 0 | | | |
| ABCD/H | 0 | 1 | | | |
| ABCD/V | 1 | 0 | 0 | 0 | 0 |
| VERT. ONLY | 1 | 0 | 0 | 0 | 1 |

Horizontal Redundancy Code List

| CODE NAME | A | B | C | D | V |
|---|---|---|---|---|---|
| ABC/H | 1 | 1 | 1 | 0 | x |
| ABD/H | 1 | 1 | 0 | 1 | x |
| ACD/H | 1 | 0 | 1 | 1 | x |
| BCD/H | 0 | 1 | 1 | 1 | x |
| AB/H | 1 | 1 | 0 | 0 | x |
| AC/H | 1 | 0 | 1 | 0 | x |
| AD/H | 1 | 0 | 0 | 1 | x |
| BC/H | 0 | 1 | 1 | 0 | x |
| BD/H | 0 | 1 | 0 | 1 | x |
| CD/H | 0 | 0 | 1 | 1 | x |
| A/H | 1 | 0 | 0 | 0 | x |
| B/H | 0 | 1 | 0 | 0 | x |
| C/H | 0 | 0 | 1 | 0 | x |
| D/H | 0 | 0 | 0 | 1 | x |

Vertical Redundancy Code List

| CODE NAME | A | B | C | D | V | A | B | C | D |
|---|---|---|---|---|---|---|---|---|---|
| ABC/V | 1 | x | x | x | 1 | 1 | 1 | 1 | 0 |
| ABD/V | 1 | x | x | x | 1 | 1 | 1 | 0 | 1 |
| ACD/V | 1 | x | x | x | 1 | 1 | 0 | 1 | 1 |
| BCD/V | 1 | x | x | x | 1 | 0 | 1 | 1 | 1 |
| AB/V | 1 | x | x | x | 1 | 1 | 1 | 0 | 0 |
| AC/V | 1 | x | x | x | 1 | 1 | 0 | 1 | 0 |
| AD/V | 1 | x | x | x | 1 | 1 | 0 | 0 | 1 |
| BC/V | 1 | x | x | x | 1 | 0 | 1 | 1 | 0 |
| BD/V | 1 | x | x | x | 1 | 0 | 1 | 0 | 1 |
| CD/V | 1 | x | x | x | 1 | 0 | 0 | 1 | 1 |
| A/V | 1 | x | x | x | 1 | 1 | 0 | 0 | 0 |
| B/V | 1 | x | x | x | 1 | 0 | 1 | 0 | 0 |
| C/V | 1 | x | x | x | 1 | 0 | 0 | 1 | 0 |
| D/V | 1 | x | x | x | 1 | 0 | 0 | 0 | 1 |

Additional Codes

| 1 | 1 | 1 | 1 | 0 | x | x | x | x |
|---|---|---|---|---|---|---|---|---|
| 1 | 1 | 1 | 1 | 1 | x | x | x | x |

Fig. 10. COMPRESSION RATIOS 160 ELEMENT GROUP

| ZONES INCLUDED | DATA BITS TRANSMITTED | HORIZONTAL | | VERTICAL & HORIZONTAL | | VERTICAL ONLY | |
|---|---|---|---|---|---|---|---|
| | | HORIZONTAL CODE BITS | COMPRESSION RATIO | VERTICAL CODE BITS | COMPRESSION RATIO | TOTAL CODE BITS | COMPRESSION RATIO |
| ABCD | 160 | 2 | 80 | | | 6 | 26.67 |
| ABC | 120 | 6 | 20 | 4 | 30 | 10 | 12 |
| ABD | | | | | | | |
| ACD | | | | | | | |
| AB | 80 | 6 | 13.33 | 4 | 20 | 10 | 8 |
| AC | | | | | | | |
| AD | | | | | | | |
| BC | | | | | | | |
| BD | | | | | | | |
| CD | | | | | | | |
| A | 40 | 6 | 6.67 | 4 | 10 | 10 | 4 |
| B | | | | | | | |
| C | | | | | | | |
| D | | | | | | | |

Fig. 11. COMPRESSION RATIOS 80 ELEMENT GROUP

| ZONES INCLUDED | DATA BITS TRANSMITTED | HORIZONTAL | | VERTICAL & HORIZONTAL | | VERTICAL ONLY | |
|---|---|---|---|---|---|---|---|
| | | HORIZONTAL CODE BITS | COMPRESSION RATIO | VERTICAL CODE BITS | COMPRESSION RATIO | TOTAL CODE BITS | COMPRESSION RATIO |
| ABCD | 80 | 2 | 40 | | | 6 | 13.33 |
| ABC | 60 | 6 | 10 | 4 | 15 | 10 | 6 |
| ABD | | | | | | | |
| ACD | | | | | | | |
| AB | 40 | 6 | 6.67 | 4 | 10 | 10 | 4 |
| AC | | | | | | | |
| AD | | | | | | | |
| BC | | | | | | | |
| BD | | | | | | | |
| CD | | | | | | | |
| A | 20 | 6 | 3.33 | 4 | 5 | 10 | 2 |
| B | | | | | | | |
| C | | | | | | | |
| D | | | | | | | |

ABCD/H
2 BITS = 80 ELEMENTS

AC/H & D/V
10 BITS = 60 ELEMENTS

ABCD/V
6 BITS = 80 ELEMENTS

BCD/H
6 BITS = 60 ELEMENTS

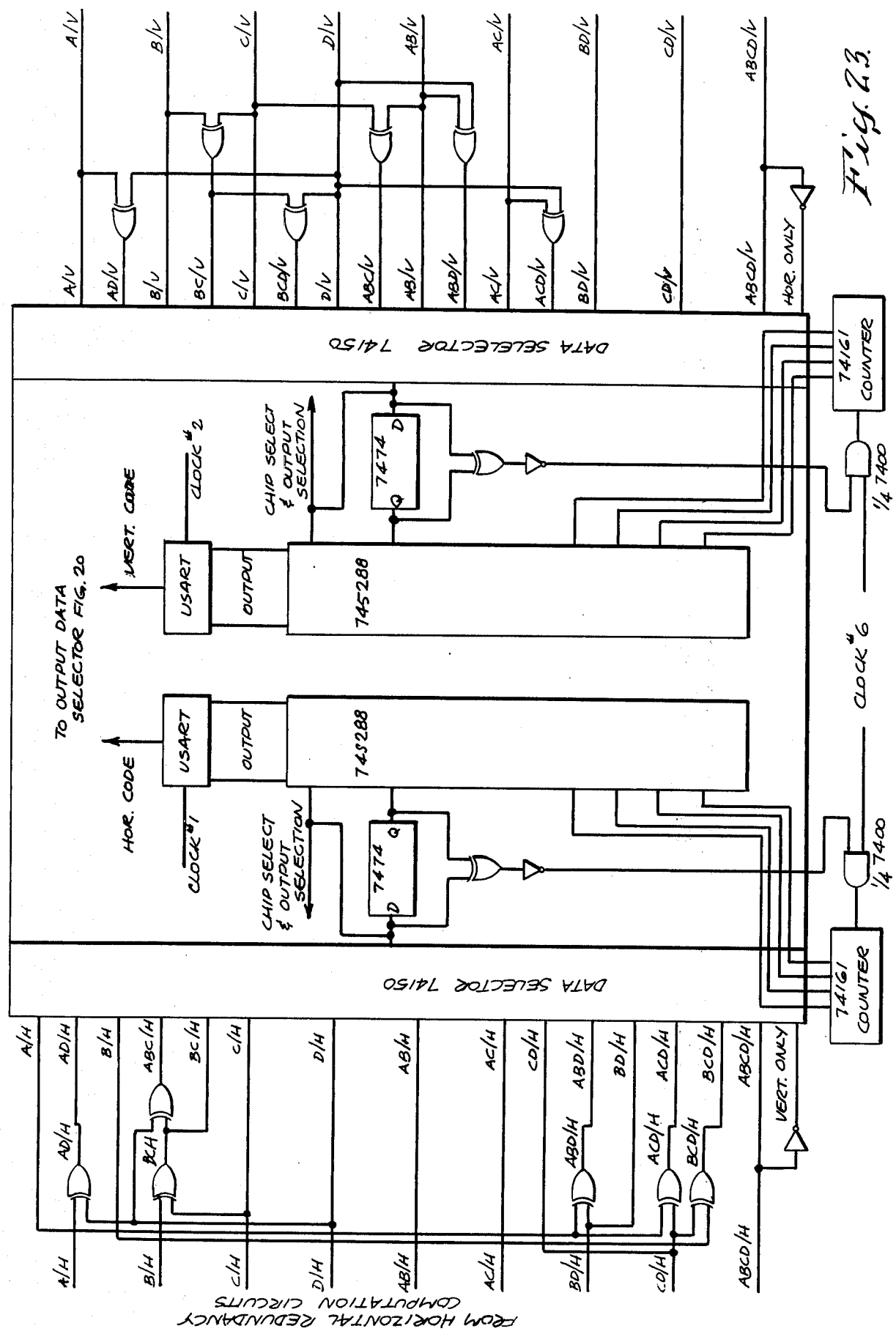

METHODS AND APPARATUS FOR TRANSMITTING IMAGE DATA

RELATED APPLICATION

This application is a continuation-in-part of application Ser. No. 550,864 filed Feb. 18, 1975.

BACKGROUND OF THE INVENTION

Commercially available equipment for storing, transmitting and printing or displaying alphanumeric characters or other symbols has been developed which uses standardized code groups of binary digital data to describe each character. These code groups can be used to store and process the data in computers, and these code groups can be transmitted sequentially over common carriers or private transmission systems for further processing or print out at remote locations. These same code groups may be decoded by printing and viewing devices which then print or display the appropriate character. The location of the characters in the field is determined by additional code groups received to describe spaces desired between characters and lines of characters.

Many such printers and viewers have been designed to print out or display the data in specific areas large enough to include one character. Some such devices are capable of printing non-character graphics within a character size area, and then, proceeding to an adjacent area, printing an additional portion of non-character graphic information in response to appropriate signal inputs. With appropriate interface and signal inputs, non-character graphics can thus be printed out over large areas by many presently used character printing devices, and in the aggregate can be made to produce facsimile reproduction. However, facsimile scanning methods and apparatus commonly in use do not produce appropriate signals to be used by devices designed for sequential character printing or viewing, because the usual practice in facsimile and video systems is to scan the document or field, line by line, in a raster which covers the complete field.

There are in use high speed alphanumeric data printers known as line printers. These units use multiple printing elements or a matrix which covers a full line of elements across the page, together with line buffers and controls needed to print one line at a time. An appropriate interface could be used to convert such units into a facsimile printer but the result would be a slow and expensive device.

In addition, normal facsimile scanning does not provide signals that can be easily coded to produce a reduction in the amount of data which has to be transmitted. In data reduction systems which do effect such reductions, the scanning device must produce data at a variable speed scanning rate across the page or travel at very high speeds and store a large amount of data in a memory system to keep pace with rapidly changing rate of data needed. Both of these alternatives are cumbersome and expensive.

Furthermore, facsimile scanning apparatus in common use require extensive amounts of memory and logic to accomplish any reduction in data transmitted where there are redundant patterns extending in a direction perpendicular to the scan. For example, to examine and code a document feature covering a sixteen element space perpendicular to the scan would require a memory capacity of approximately 13,600 bits, and the logic to examine and encode the codable parts within this area would be complex.

Thus, with equipment heretofore available, a user of alphanumeric printers and facsimile equipment has been required to use two separate systems, even though the equipment is not being fully utilized. It has often been impractical to transmit facsimile images over the extensive networks of leased and switched lines used for alphanumeric printing (or "teleprinting" as it is sometimes referred to). These lines are often limited to data rates of 110 to 300 bits per second; a capability at which a full page of facsimile at 110 bits per second would take 2 hours and 10 minutes.

Accordingly, it is in general the object of this invention to provide a facsimile transmitter capable of efficient data compression, which generates signals that are compatible with sequential alphanumeric printers.

It is a further object of this invention to provide an efficient facsimile data reduction system which uses sequential sub-scannings of small finite rectangular sections of the document whose image is to be transmitted, and a coding method which encodes both vertical and horizontal patterns of redundancy.

It is another object of this invention to provide a highly efficient facsimile data reduction system which is operative as a binary two level digital system, or as a binary multi-level digital system per se which may alternatively be an effective substitute for an analog system.

It is still another object of this invention to provide a single printing device which can print out alphanumeric images from standard alphanumeric data, as well as facsimile images from appropriate facsimile data in sequence as received from a single channel or different channels.

Yet another object of this invention is to provide an efficient facsimile data reduction system using sequential sub-scannings of small finite rectangular sections of the document whose image is to be transmitted, and a coding method which encodes the sub-scan of the facsimile as a recognizable alphanumeric character, and sends out standard alphanumeric codes, or as a data reduced facsimile by encoding the redundancy, or as uncoded facsimile data as scanned from sub-sections.

Still another object of this invention is to provide an efficient, lower cost, data-reduced facsimile system in which the high speed scanning required is limited to a small, finite rectangular, sub-section of the document, utilizing a small, low-cost reading device and indexing from section to section in slower steps with a low cost transport means.

Another object of this invention is to provide a facsimile transmitter which produces signals from sequential sub-scannings of small finite, rectangular sections of the document whose image is to be transmitted wherein the area of the sub-scanned matches the alphanumeric character area used by the receiving printer when printing alphanumeric data.

SUMMARY OF THE INVENTION

In accordance with one embodiment of the present invention, there is provided a scanning system, for use in a facsimile transmitter, which employs a sub-scanning of a small rectangular area of the document to be transmitted such that all signal elements corresponding to one sub-section of the document are transmitted sequentially in one group. The size of the sub-section scanned is matched to the area that can be conveniently printed at the receiver by the printing head while it occupies a position normally used to print one alphanumeric character or symbol. The alphanumeric printer is additionally provided with a mode switching means to switch from character printing to facsimile printing, and a means for activating the printing head so as to print into a one character size area a facsimile image corresponding to equivalent size sub-scan of the document. The transmitter then moves to an adjacent sub-scan area and printer head is commanded to move to its corresponding adjacent position. The process is repeated until a complete page is transmitted or until desired sections of graphics is printed.

Other embodiments may be utilized to provide data compression. A buffer is used to store the facsimile data from each sub-scanned section. As the data enters the buffer, the presence of a codable redundancy of either a vertical or horizontal nature in one or more of the partitioned parts of the image data may be detected, and the appropriate codes and/or uncoded facsimile signals may be transmitted while a second buffer receives data from the next sub-scanned section.

DESCRIPTION OF DRAWINGS

The invention may be understood from the following description of embodiments of the invention and accompanying drawings in which:

FIG. 9 is a chart of bits required and compression ratios obtained for code combinations of FIG. 9 used on a 160 element code group.

FIG. 10 is a chart of bits required and compression ratios obtained for code combination of FIG. 9 used on a 160 element code group.

FIG. 11 is a chart of bits required and compression ratios obtained from a 80 element code group.

FIGS. 16, 17 and 18 show alternate coding zone configurations within two adjacent code groups.

FIG. 23 is a schematic drawing of another portion of the apparatus of FIGS. 19 thru 22.

DESCRIPTION OF PREFERRED DRAWINGS

Figure 1:
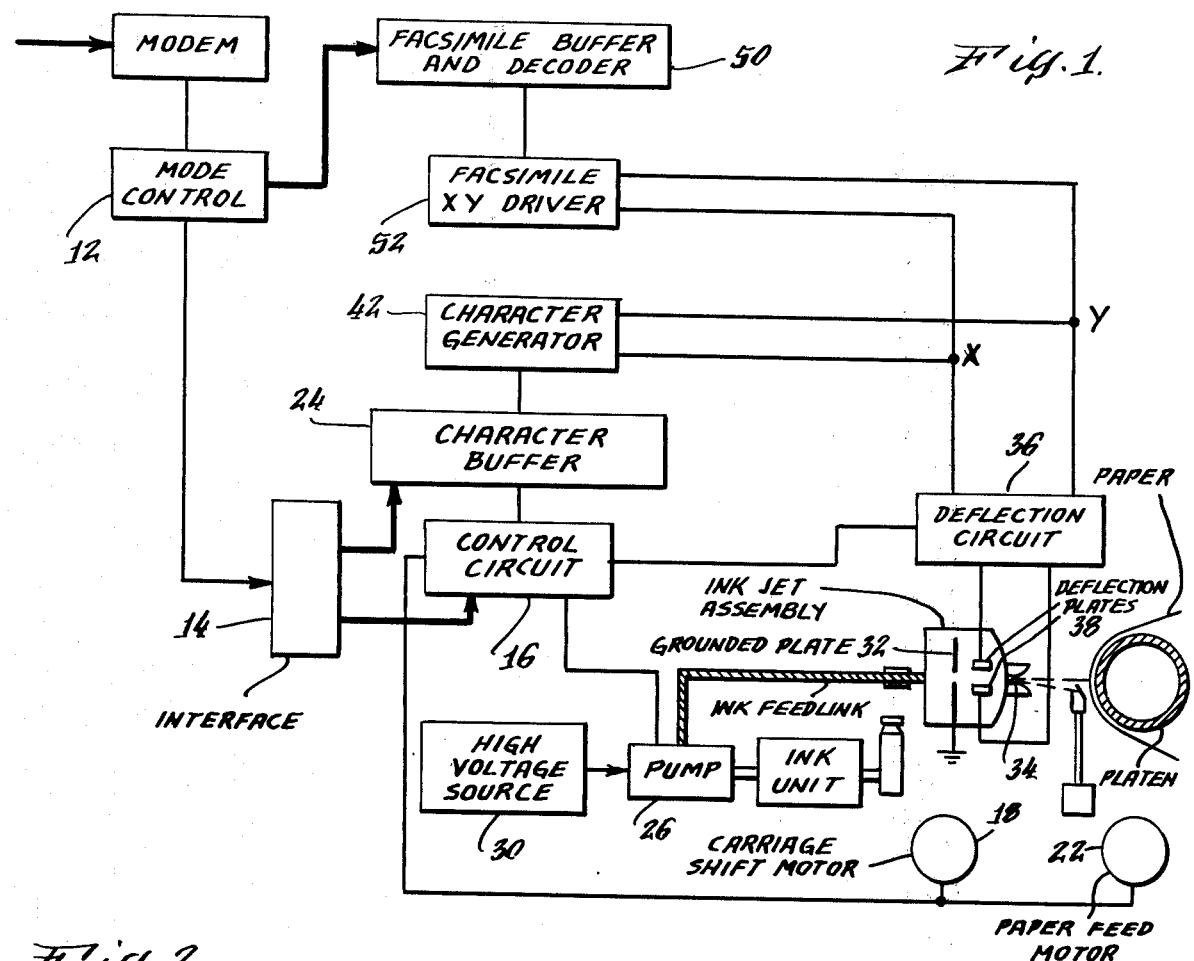
FIG. 1 is a block diagram of a receiving unit embodying the dual capability of this invention to receive facsimile data or alphanumeric data.

Referring first to FIG. 1, there is illustrated a printer of the ink jet type. When operating as a character printer, the input signals are passed through the mode control assembly 12 to the printer interface 14. In response to standard teleprinter code signals the printer is activated and signals are sent to the control circuit 16 where they are decoded and appropriate commands are generated for control of the printer as follows:

Signals for carriage shift and carriage return are converted to drive pulses for the carriage shift motor 18 which causes the ink jet assembly 20 to index across the page, one character space at a time, or return to the left margin. Signals for line feed are also converted into drive pulses for a paper feed motor 22 by the control circuit.

Signals to print characters are loaded into the character buffer 24, and the ink system pump 26 is turned on so that a flow of ink is fed through the ink feed line 28 to the ink jet assembly 20. The fine stream of ink particles entering the jet assembly is electrically charged by a high voltage source 30 connected to the ink pump 26. The particles are therefore accelerated to a high speed towards the grounded plate 32 in the ink jet assembly along a central axis through openings 34 in the ink jet assembly.

When no printing is called for, the stream of charged ink particles is deflected from the central axis by a voltage applied by the deflection circuit 36 on the deflecting plates 38 of the ink jet assembly so that the particles land in a waste ink cassette 40.

When sufficient character signals have been loaded into the character buffer 24, they are transferred, one character at a time, into the character generator 42. The character generator 42 then produces the necessary voltage on the deflection plates 32 and the ink jet stream is deflected so that the desired character is printed on the recording paper 44.

When the printer is receiving facsimile data, the mode control circuit 12 transfers the data into the facsimile buffer 50. The mode control 12 also detects the division between sub-scan groups by counting, and transfers a properly timed carriage shift signal to the printer interface. In the present embodiment, the sub-scanned area size of the facsimile character is 1/6 of an inch in height, so that a standard single space line feed of a 6 lines per inch printer will move the paper exactly 1 facsimile character vertically. This means that the adjacent rows of facsimile characters will be brought together to form a continuous facsimile image. At 96 lines per inch of facsimile resolution, a preferred facsimile character will have 16 elements or rows in height. In the horizontal direction a preferred character will be 1/10 of an inch in width to correspond to the standard of 10 characters per inch. The facsimile resolution in the horizontal direction may be chosen to be 100 lines per inch, so 10 elements or columns are required for the 1/10 inch wide facsimile character. Indexing one character space between facsimile characters will result in a continuous facsimile image in the horizontal direction. The alphanumeric characters are slightly smaller so a normal line and character space results as shown in FIG. 3.

The facsimile buffer 50 contains two, 160 bit buffers that are filled from incoming signals alternately. As each buffer is filled, the data is transferred to the facsimile x and y driver 52 so that data can be printed sequentially in 10 vertical columns of 16 elements each. The transmitted data is timed to lag just behind the print speed capability of the printer. After each 160 element sub-scan is completed, the printer head is advanced 1/10 of an inch and the next sub-scan is activated. At the end of the line, the paper is advanced 1/6 of an inch and the carriage returned to the left margin.

It should be understood that this invention can be applied to other types of printers as well as the type described above, such as thermal printing devices, mechanical matrix printers, electrostatic matrix printers, electrosensitive printers and optical printers or others.

This invention can also be applied to facsimile printing devices which print one element at a time, or a line of elements by use of memory devices which receive data representing sequential sub-scannings of the image, and transfer signals to the printer so that the image is reconstructed.

Figure 2:
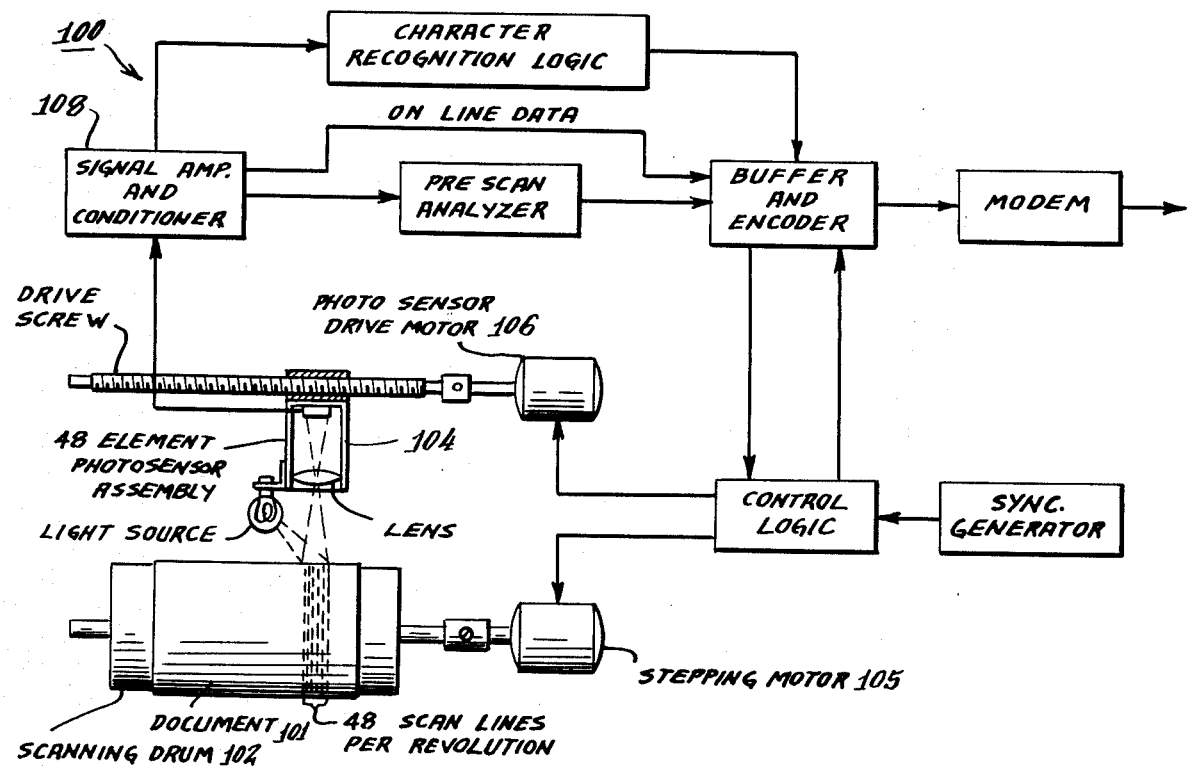
FIG. 2 is a block diagram of a facsimile transmitter employing sub-scanning feature of this invention.

Referring now to FIG. 2, there is illustrated a facsimile transmitter 100 which embodies the sub-scanning feature of this invention and permits compatability with sequential teleprinters, and so facilitates design of a small size and low cost unit and provides a preferred scanning pattern for a simple data compression method.

The document 101 to be transmitted is fastened to the scanning drum 102, in such a position that the rotation of the scanning drum causes a photodiode assembly 104 to "read" the document 101 from the left margin toward the right margin. Scanning is started with the photodiode assembly 104 at the top of the document 101, or at the top of the section of graphics to be transmitted.

The stepping motor 105 moves one element and the signal from each of 16 photodiodes is transferred sequentially into the signal amplifier 108. The stepping motor 105 then advances to the next element followed by photodiode reading of the next column of 16 elements. After 10 steps of the stepping motor 105, a sub-scan of 16×10 matrix of elements has been transferred. This group of 16×10 elements was scanned from an area 1/6 of an inch by 1/10 of an inch because the lens of the photodiode assembly 104 is adjusted so that the 1/6 of an inch of height on the document 101 is focused on 16 elements of the diode array. Also, the gearing of the step motor 105 is arranged so that 10 steps produces a total travel on the document surface of 1/10 of an inch. The process is repeated on the next 10 steps of the step motor 105 to scan an adjacent group of 16×10 or 160 elements.

After completion of one set of sub-scanning across the page, the photosensor drive motor 106 indexes the photosensor assembly to the next line to be scanned. The indexing of the photosensor drive motor 106 can be replaced by a proportional driving means so that photosensor assembly 104 advances 1/6 of an inch during scan across the page. It will be noted that only 16 of the 48 photosensors shown in FIG. 2 are used to generate the data as described above.

The other 32 photosensors shown in FIG. 2 are used to supply data to the pre-scan analyzer. The functions of pre-scanning and image analyzing will be described later.

It should be understood that this invention can also be utilized with other scanning assemblies, such as a photosensitive matrix which scans across the page while the paper remains stationary. Even the standard facsimile scanners of the "flying spot" or rotating drum type can be used by modifying the scanning pattern or interposing memory devices which will convert the transmitted data to represent sequential sub-scannings of the image.

It should also be understood that although the description of this embodiment is presented in terms of a two level digital system, analog and multi-level operation as described later may also be accomodated.

The printing head at the receiver is indexed for each group of 160 elements. If printing rate in characters or positions is 15 per second or less and the transmission channel capacity is 2400 bits per second, the data compression feature and the encoding circuit is not needed since 15 positions×160 elements per position is 2400 bits per second. The transmitter can run at 2400 bits per second and keep the printer running at a maximum position indexing speed.

However, a channel capacity of 300 bits per second or less is commonly used in teleprinting applications and printers commonly have higher printing rates, so that the transmission speed of facsimile is usually limited by the transmission line.

From the foregoing, it will be seen that it is possible with this invention to utilize standard alphanumeric receivers to print out both alphanumeric and facsimile data other than that which the receiver may have stored in its memory banks by causing the transmitter to subdivide the material to be transmitted into zones which correspond to the area allotted to each character in the receiver print-out, further sub-dividing each such zone into a matrix of rows and columns describing image elements, and rendering into data bit form suitable for transmission and reproduction by the receiver information descriptive of the characteristics of the image elements in said zone.

Additionally, whenever the transmission rate of the facsimile characters is limited by the transmission line, the data compression method of this invention may be used to speed up the facsimile transmission.

This invention also envisions compressing transmission times by encoding imagery data in a reduced number of data bits based on the extent to which groups of sub-division of a data scan zone are the same in character as reference sub-divisions to which all of the sub-divisions in a given group are compared. It should be kept in mind that in this context "imagery" means any kind of communicative configuration, such as print, writing, outlines, graphs, pictures, etc.

For example, assume it is desired to encode the images on a sheet of paper for transmission to a decoder which will reproduce the image content of the scanned sheet of paper. In accordance with this invention, one first divides the entire image-bearing surface of the sheet of paper into a matrix of scan zones. Thus, if the sheet is divided up by a number of vertical and/or horizontal lines, the regions between the lines will form convenient "scan zones", or areas sufficiently small to enhance codification as herein described. The criteria for choosing the size of given scan zones includes consideration of the image density within a given zone. Thus, if the page contains a block of writing followed by a graph, for example, it will be apparent that transmission efficiency will be enchanced by relatively large area scan zones for the margins, less large areas zones for the graph area, and relatively small area zones for the writing area. Furthermore, the zone areas may be varied from location to location on a given sheet.

Now considering a given zone, it may be further sub-divided into a series of vertical columns and horizontal rows which collectively form a matrix of image elements. For example, if a 0.010 inch square zone is divided into four vertical columns and five horizontal rows, the result would be a matrix of 20, horizontally oriented rectangular image elements. Now imagine placing along one side of the scan zone a row of "reference" image elements of the same vertical dimension as the vertical dimension of the image elements within the scan zone, and also placing along the top of the scan zone a row of "reference" image elements of the same horizontal dimension as the horizontal dimension of the image elements within the scan zone. The image elements comprising the first horizontal row of image elements within the scan zone could, successively from left to right for example, he described as "the same as" or "not the same as" the uppermost reference image element in the vertical row of image elements, and so forth for each row in the scan zone with respect to its associated reference element. Similarly, the image elements in each vertical column can be described "the same as" or "not the same as" the reference image element in the horizontal row of reference image elements with which that column is associated.

Assume now that the sheet of paper is placed on the drum of the scan apparatus shown in FIG. 2, oriented so that the sheet is moving sideways relative to the scan head, the scan head will, in effect, "see" successive points down each row and can thereby obtain and store in an associated memory bank information bits indicating the character of each of the image elements in the entire zone (e.g., which are white or are black). With this information stored in a memory bank, it is possible by techniques which are well known per se, to compare each of the image elements in a given row with the reference image element in the vertical row of reference image elements, in order to determine as to each element in a given row whether it is the same as or different from the reference image element associated with that row. If there is, over the entire scan zone, "sameness" between all of the elements of each row and the reference image element for that row, then the characteristics of the entire scan zone may be simply codified for transmission by entering a code signal which merely "tells" the receiver to reproduce the same pattern of image elements all the way across that scan zone as it has "memorized" as the vertical row of reference image elements. For example, if the third reference image element down from the top is black and all of the others are white, and if the transmitter scan of the zone shows that all of the elements in the third row down are black but that none of the other elements in the zone are (i.e., that there is a horizontal black line completely across the scan zone, which, of course, may be merely a segment of a longer line, depending upon the chosen width of that scan zone), then the receiver, by being told to print the character of each reference element in the vertical array as successive, abutting columns all the way across the scan zone, in effect will be being told to print a black line entirely across the scan zone at the position of the third row.

If the analysis of the memory across the rows does not indicate that each of them is entirely the same as their respectively associated reference elements (e.g., with reference to the above example, that there no longer is a black line in the third row, or that the line stops short of the complete span width of the zone, or that in all or part of one of the other rows a black line becomes detected), the horizontal analysis of the memory will stop and a vertical analysis of the memory will commence, this time for the purpose of determining whether all of the elements in each of the columns are the same as the reference element in the horizontal row of reference image elements with which each is associated. If they are, again a simple code signal can "tell" the receiver that it has merely to reproduce in a downward direction the horizontal row of reference image elements and it will have reproduced the imagery included in the scanned zone. If they are not, it is now clear that the imagery in the scan zone cannot be described in terms of its row or columnar redundancy with respect to reference image element arrayed as comparisons for either dimension, but that instead a more lengthy code description of the entire zone will have to be transmitted by scanning each element in the zone individually, and transmitting uncoded descriptive data bits.

However, recognizing that the last vertical column of elements and the bottommost row of elements in the scanned zone are likely to provide the best available (or "upgraded") index or a key to the degree of "sameness" or lack thereof), of the image elements comprising the rows of the scan zone next adjacent to the scanned zone and the vertical columns of the scan zone next beneath the scanned zone respectively, these columns and rows can be retained for reference purposes in scanning additional adjacent zones. Of course, if successive rows and columns in an entire matrix are to be analyzed ultimately, there will soon have been developed a horizontal and a vertical row of reference images for each zone to be scanned; i.e., it will no longer be necessary, (as in the first instance for the first zone, for the horizontal references to the first row of zones, and for the vertical reference to the first zone in each of the rows of zones), to arbitrarily assume the character of each of the references images in each reference row purely for the purposes of once establishing "same" or "not the same" set of responses.

It will also be apparent, that, as noted above, a single digital signal (e.g., "1") can be used to designate complete "sameness", (or redundancy with respect to the vertical row of references) horizontally for each zone, and that the opposite signal, (e.g., "0") can be used to indicate "lack of sameness" in the horizontal dimension. Thus a group of successive digital signals ("1" or "0") can be used to indicate the horizontal "sameness" (or lack thereof) situation which obtains to a series of scanned zones. If all are the same as their respective references, the receiver needs no more information in order to proceed with its print out. However, if one or more are not the same, it is still possible for there to be vertical "sameness", and so if less than total horizontal sameness is indicated, a code series disclosing the extent of vertical "sameness" can be made to follow, again in the aggregate form of one or two digital characters for each scanned zone. If vertical "sameness" does occur with respect to the "0" encoded zones, the receiver now has all it needs in order to reproduce the page. Notice however, that by now additional transmission time has been consumed, but that it is still substantially less than that which would be consumed had all of the zones had to be completely encoded. If such vertical "sameness" is not indicated, however, the receiver "knows" it cannot reproduce the page entirely (even though it has sufficient information to reproduce all of the "same" zones) without having a detailed description for each of the zones lacking "sameness". By known methods, such as description may then be transmitted in either the horizontal or vertical mode.

Figure 3A:
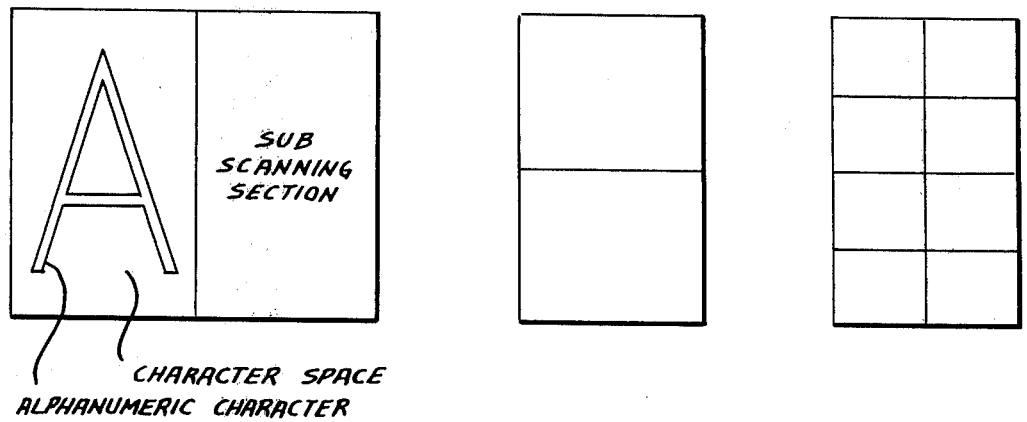
FIG. 3a-b illustrates typical sub-scanning sections together with an alphanumeric character and typical partitioning.
Figure 3B:
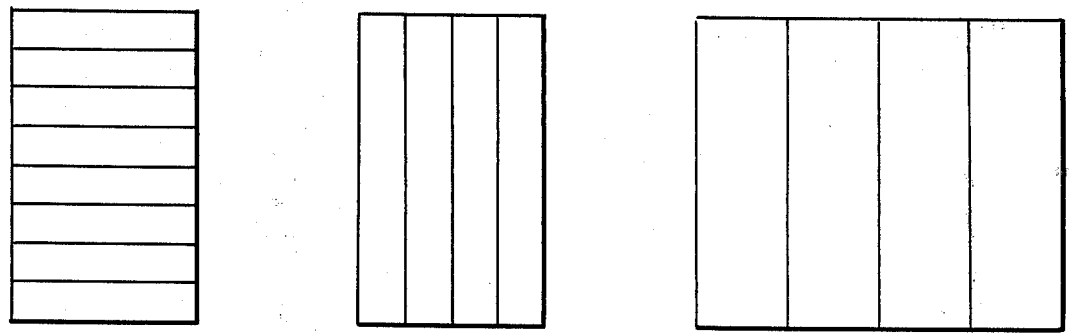

With this explanation in mind, and the foregoing description of apparatus as shown in FIGS. 1 and 2 by which it may be processed, we may now turn to a more detailed discussion of certain aspects of this invention which are as follows:

Referring now to FIG. 3a–b, typical sizes and shapes of a sub-scan section are shown along with different arrangements of the partitioning. It should be understood that this invention relates to a multiplicity of zones within an entire scanning section or sub-section. Four zones are shown in each sub-section to simplify the explanation of the operation. As will be explained later, the same coding list is operative with any of the partitioning shown in FIG. 3a–b. Variations of the code list would permit partitioning into more or less zones in accordance with this invention. Furthermore, the number of picture elements in each zone is independent of the zone coding. For example, the resolution can be switched from a low setting to a high setting and back, or the resolution can be changed to any desired difference between the vertical and horizontal direction without affecting the codes used or their interpretation.

This permits the use of a raster size and aspect ratio which produces the most useful result on a particular class of document while coding is unchanged. Another advantage of this invention is that the raster size and aspect ratio can be adjusted to accommodate the cost and standardization of the components required.

Figure 4:
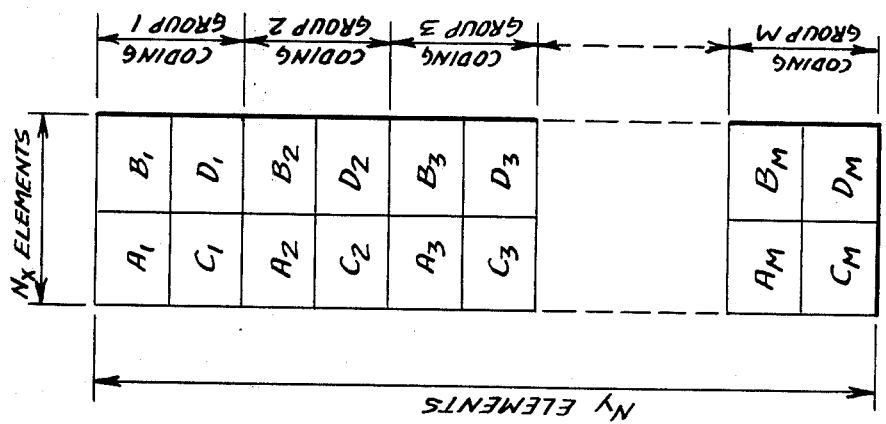
FIG. 4 illustrates a larger sub-scanning section divided into several code groups which are each partitioned into two coding zones.

Referring now to FIG. 4, there is illustrated a sub-scanning section which is divided into a multiplicity of code groups. This illustrates techniques which may be used to increase the size of the sub-scanning section while maintaining the code group size and zones within a most useful range. One reason for wanting to increase the sub-scanning size is to reduce the speed of indexing required between sub-scannings. Another reason is to allow the use of a smaller coding group while sub-scanning is matched to an alphanumeric printer as described above.

Figure 5:
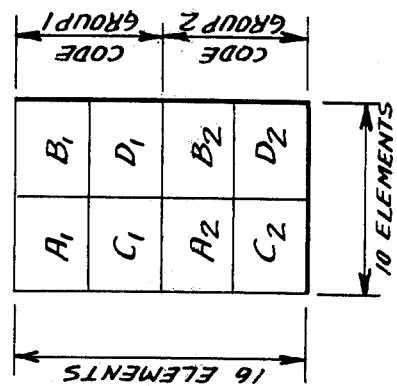
FIG. 5 illustrates partitioning of 2 code groups contained in 1 sub-scan section.
Figure 6:
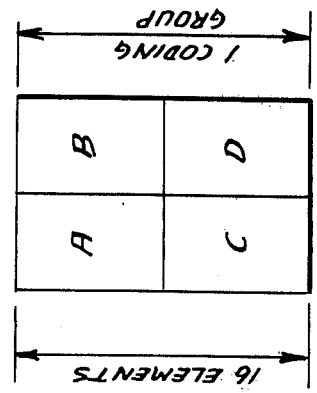
FIG. 6 illustrates partitioning of a 1 code group contained in a sub-scan section.

Refrring now to FIG. 5 a sub-scanning section is shown which matches the usual alphanumeric printer character size. It is illustrated with a partitioning into two code groups of 4 zones each. FIG. 6 illustrates partitioning the same sub-scanning section into one code group of 4 zones. Either partitioning can be used with the same code lists, as will be explained later. It will be understood by those skilled in the art that processing code group 1 followed by identical processing of code group 2 shown in FIG. 5 will be equivalent to processing the one code group of FIG. 6. There are differences however in compression ratios obtained and it will be beneficial to the understanding of this invention to analyze the differences.

Figure 7:
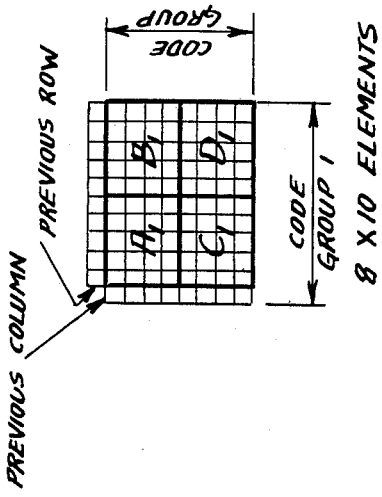
FIG. 7 illustrates the division of the code group #1 of FIG. 5 into rows and columns of image elements and shows the previous column and the previous row from adjacent groups.

Referring now to FIG. 7 there is illustrated the FIG. 5 code group which contains a total of 80 elements and will be referred to as the 80 element group. This group is divided into 4 zones of 20 elements each. The zones are identified as A, B, C, and D. Each zone has 4 horizontal rows of elements and 5 vertical columns of elements. In the example of this invention that is being described here, use is made of the previous column and the previous row as indicated in FIG. 7. Information on the data content of the previous row and previous column is stored in the transmitting buffer and the receiving buffer.

Figure 8:
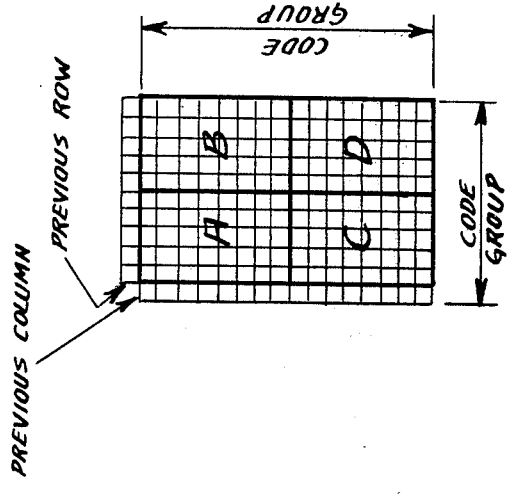
FIG. 8 illustrates division of the larger group of FIG. 6 into rows and columns of image elements and shows the previous column and the previous row from adjacent code groups.

FIG. 8 illustrates a corresponding code group of the sub-scan section shown in FIG. 6. This code group contains 160 elements and will be referred to as the 160 element group.

This embodiment of the invention provides for simultaneously detecting either horizontal redundancy or vertical redundancy in each zone. These codable zones are then combined into a code group which encodes either horizontal or vertical redundancy in the group of zones or encodes combinations of vertical or horizontal redundancy in the same code group.

Since the concept of encoding a two dimensional space in either a horizontal mode or a vertical mode or both is one of the significant features of this invention it will now be discussed in detail. Referring again to FIG. 7 there is shown an 80 element, two dimensional space containing 80 elements arranged into 8 horizontal rows of elements which are vertically adjacent so as to occupy a rectangular space containing 8 rows of elements. It is useful in understanding the following explanation to recognize that this same space can be described as containing 10 vertical columns which are horizontally adjacent so as to occupy the same rectangular space containing 10 columns of elements.

"Horizontal redundancy" within a space, zone, code group or sub-scanning section occurs when all the columns within such an area contain a data pattern which is identical to the previous adjacent column. It follows that all the so specified columns are identical to each other and also are identical to a previous column adjacent to the zone or group being considered. Thus there is shown in FIG. 7 a previous column which is outside the code group but adjacent to it. It will be understood that "horizontal redundancy" occurs as a result of a horizontal image feature running through the code group.

"Vertical redundancy" occurs when all the rows within a specified area are identical in data content to a previous row. This also results in a previous row outside the specified area, but adjacent to it, being identical to all the rows within the area. It will be understood that vertical redundancy occurs as a result of a vertical image feature running through the document.

Based on this concept, it will be clear that as discussed in detail above, given a code in the memory bank for the condition which exists in each of the elements of the "previous" column or row, as the case may be, the succeeding portion of each row or column which is covered by the particular zone or group being considered, may be described in terms of whether the successive elements of each such column or row are or are not exactly like the element next preceeding it (i.e. are or are not "redundant"). As to each one which is, the system needs only to be "told" by simple and fast signaling to repeat what had gone on before. As to each one which is not, the system needs to be "told", so that it can switch to the more complex description necessary to detail the exact situation (and therefore incorporate the change) which exists there.

Referring now to FIG. 9 a code list is shown which illustrates the codes that are used in this example to describe horizontal redundancy, or vertical redundancy, or both horizontal and vertical redundancy, as it occurs in the code group area or in any combination of zones within the group. It will be understood from the following explanation by anyone skilled in the art that this example represents a highly efficient specific data compression code. It will also be understood that this example shows that many other code combinations and code lengths can be used in accordance with this invitation to accommodate types of documents and other partitioning arrangements of more or fewer zones.

As shown in FIG. 9 the first code "0" indicates that codable redundancy as described in the remainder of the list did not occur within the code group to be transmitted next, so that the data following is a full code group of uncoded facsimile data. The next code "01" indicates that the entire code group including zones A, B, C and D contains horizontally redundant information as defined above. The next code "100000" indicates that the entire code group including zones A, B, C, and D contains vertically redundant information as defined above. The next code 100001 called "Vert. Only," indicates that no codable horizontal redundancy exists in any of the zones but the next 4 bits will indicate vertical redundancy in specific zones in accordance with the code list entitled Vertical Redundancy.

The meaning and usefulness of the codes listed under the heading "Horizontal Redundancy" will be clearly understood from the following description of the format used. The name of each code contains letters corresponding to zones included. An H is added to indicate horizontal redundancy. The first bit of all these codes is a 1 to indicate that it is the beginning of a code group. The next four bits identifies the zones to be included. A "1" indicates horizontal redundancy is present and "0" indicates that the zone is not codable horizontally. As indicated by column headings A, B, C, and D, the second bit of the code refers to the state of the A zone, the third bit refers to the B zone, the fourth bit refers to the C zone and the fifth bit of the code refers to the D zone. Examination of the code list will reveal that any combination of horizontally redundant zones from 1 to 4 in number is codable from this list.

The sixth bit in the code under the column heading of V is marked with an "X" to indicate that a "1" or "0" may be used. Except in the case where all zones are redundant, a "0" in the sixth position means that although the code is complete at 6 bits, there are one or more zones that have not been identified as being horizontally redundant, and that uncoded facsimile data will follow the code to fill in the uncoded zones. The data will preferably be sent in the sequences of A, B, C and D zones while skipping the encoded zones. The receiver will preferably print the zones in the same sequence. In this way the receiver will have a previous column and row in the receiver buffer for zone A. Progressing from A thru D the receiver will generate its own previous column and previous row for each zone as needed for printing the encoded zones.

Referring again to column V of the horizontal code list, the X shown may be made to have a state of "1" to indicate that even though there is not redundancy as between all of the zones as indicated by the second, third, fourth and fifth bits of the code, instead of following with an uncoded readout for the non-redudnant portion(s), there will follow vertical redundancy code which will describe the zone in question, either in terms of vertical redundancies if that is the condition, or with an indication by one of the constituent bits that total redundancy is lacking, in which case a noncoded readout of the non-redundancy portion will follow.

Referring now to the codes listed under the heading "Vertical Redundancy," we see that the first column remains "1" and the sixth column is a constant "1" in this group of codes. The "X's" placed in the first ABCD group indicate that any combination of a horizontal zone code may precede the vertical codes. The vertical codes are represented in a way that is similar to the horizontal list.

One example should suffice to clarify the usefulness and meaning of the code list. If A and C showed horizontal redundancy while D contained a vertical redundancy the code name would be AC/H and D/V. The code transmitted would be "110101001" which is a joining of the codes AC/H and D/V as described above.

Additional codes not found or used elsewhere in the list can be used for additional commands, such as "start transmission", "end of line," "repeat last group," "end of transmission," "switch to alphanumeric mode" or for identifying which printers in a network should print the data to follow.

Referring now to FIG. 10 the data compression ratios are shown as a ratio of data bits transferred to the code bits required when the coding method described above is applied to the 160 element group of FIG. 8. The zones included are shown along the left side of the chart and mode of redundancy is shown across the top of the chart. FIG. 11 shows the same data for an 80 element group of FIG. 7.

As expected the compression ratios obtained in the 160 element group are double those obtained from an 80 element group. This means that the 160 element group is preferred except that the type of documents used may contain a large remainder of information detail that is uncodable within the smallest zone of 40 elements. The diminishing returns in the usefulness of using very large or very small code groups will become apparent from the following examples.

In uncompressed facsimile using a resolution of 96×100 elements per inch and transmitting at a commonly used rate of 2400 elements per second would require 374 seconds to transmit an 8½×11 document.

A sample document may be selected which has 75% of the information codable in 160 element groups. The 160 element code group would transmit 75% of such a document in 3.5 seconds with a compression ratio of 80. The 80 element code group would transmit the same 75% of such a document in 7 seconds at a compression ratio of 40. As expected there is a 100% increase in time required but the numerical difference of 3.5 seconds is small.

It is also reasonable to assume that such a document would have some information areas codable by the 20 element zone of the 80 element code group that are not codable within the 40 element zone of the 160 element code group. If this increased amount of information codable by the 80 element code group but not by the 160 element code group is as much as 2%, there is a difference of 3.75 seconds based on a lowest compression ratio of 2 compared to a ratio of 1 for uncoded transmission.

In this simplified example, a maximum compression ratio of 40 compared to 80 is more than compensated for by encoding an additional 2% of the document. This characteristic is common to all compression coding methods and is well known by those skilled in the art. It is referred to here to explain the basis for diminishing returns as the code group size is increased beyond 160 elements. It will be understood that the optimum condition in any given case depends on the documents used and the resolution of the system.

As the code group is made smaller, a point of diminishing returns is reached as the code length used approaches the total elements per zone. For example, if the zones were 10 elements each, the last four codes would be useless since a 10 bit code would be sent in place of 10 bits of uncoded data. Also the maximum compression ratio would reduce to 20 so the loss of time to transmit large redundant areas becomes increasingly significant.

The foregoing explanation serves to identify factors which control the range of optimum code group size. It also suggests that significant improvements in the state of the art will result from the techniques of relating codes to document features which is a feature of this invention.

Figure 12:
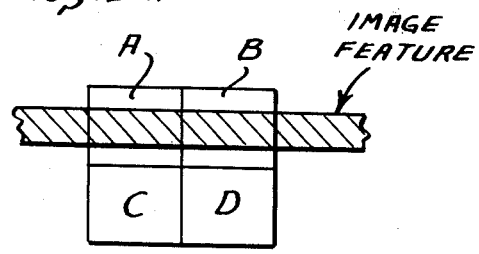
FIGS. 12-16 illustrate typical document features and corresponding codes.

Referring now to FIGS. 12, 13, 14 and 15 there is illustrated typical document features as they related to the coding zones. These figures will be used to explain in more detail, certain objects and advantages of this invention. They will also be helpful in clarifying certain aspects in which this invention effects advances over the prior art. FIG. 12 shows a horizontal image running through the coding zones of A and B.

It will be understood that, in accordance with the methods described above, this is an example of horizontal redundancy within the area ABCD. In the prior art, there are described methods of coding redundancy in a two dimensional area by comparing adjacent areas in a predetermined sequence. In this connection, reference is made to Gruenberg U.S. Pat. No. 3,504,112. According to prior art proposal, the method describes the equivalent of folding or sliding A over B. It will be understood that folding or sliding A over B and C over D will result in a recognition of horizontal redundancy in AB and in CD. However if the next step is to fold or slide AB over CD, the recognition of redundancy stops because a fold or comparison between rows in the equivalent of a method of detecting vertical redundancy. Such a prior art method may have been an advancement in the art compared to detecting and encoding redundancy in an image in one direction, along a single line.

This prior art method is effective on a specific type of document feature, such as when A, B, C, and D are all white or all black. In accordance with the present invention it can now be understood that an all white space is itself redundant in either direction. Applying the prior art method of folding or sliding A over B and C over D followed by AB over CD discovers redundancy of the total only when the image area contains dual redundancy. The same is true of other prior art which refers to methods of progressively combining the image data from adjacent areas. In this connection, reference is made to U.S. Pat. No. 3,726,993.

As will be seen from an inspection of the other image features, the invention described herein provides for encoding either horizontal redundancy, or vertical redundancy, or both, with sub-scanned sections.

Figure 13:
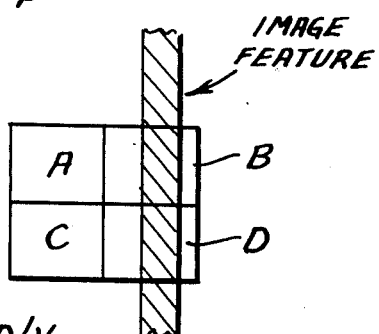

Referring now to FIG. 13 a vertical image is shown running through the coding zones. It will be understood that this will result in a full encoding of A, B, C and D as vertically redundant. Prior art techniques would recognize only a partial redundancy and then only if the predetermined sequence did not first compare A to B and C to D. In that case recognition of any redundancy is lost at the first level of combination.

Figure 14:
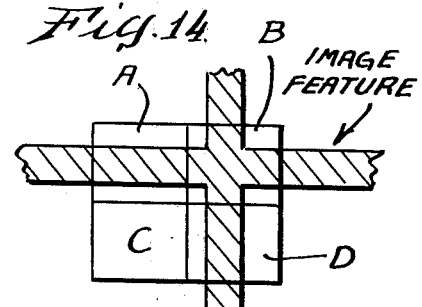

Referring now to FIG. 14 perpendicular image features are shown crossing in the coding zones. It will be understood that A and C are horizontally redundant and D is vertically redundant. The transmission describing this group would be a 10 bit code describing AC/H and D/V followed by uncoded facsimile data to describe zone B. It will be understood that other prior methods of generating a code by superimposing or comparing A, B, C and D of FIG. 14 would show no redundancy becomes geometrically or systematically there is no match unless each is scanned and compared in such a way that the recognition of redundancies can be easily and automatically made.

Figure 15:
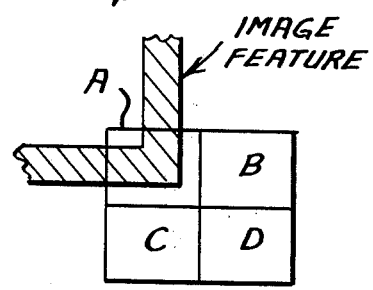

Referring now to FIG. 15, the appropriate coding of a group is shown when one of the zones is uncodable. Another feature of this invention is illustrated by this FIG. 15 and the other image feature drawings. In FIG. 15, B, C, and D could be coded as horizontal or vertical. When both modes of redundancy are recognized, the priority of coding favors all zones being recognized as the same, as a first choice, and all possible zones as horizontal, as the next choice. This is because the horizontal codes are shorter than the vertical codes. This method is also illustrated in FIG. 12 wherein C and D can be recognized as redundant in both directions. A horizontal mode is selected because the entire code group of 4 zones can be coded horizontal.

Referring again to FIG. 4 there is illustrated a sub-scanning section in accordance with this invention which is divided into a multiplicity of zones. A preferred embodiment of this invention will now be described wherein some of the code groups such as group 1 and group 2 are utilized for encoding redundancy at a transmitter and decoding it at a receiver in accordance with a coding system such as shown in FIG. 9. An additional number of code groups, such as 4, is used in the preferred embodiment of this invention at the transmitter for pre-scanning the document ahead of the transmission so as to provide image location information and image redundancy information.

First the method of collecting and using the image location information will be explained. In this preferred embodiment, two code groups are being used "on line" to produce data that is encoded and transmitted as the photosensor assembly shown in FIG. 2 scans across the page. This means that 16 elements of the photosensor assembly supply data to the "on line" transmitting function. As additional 32 elements of the photosensor assembly are simultaneously scanning the image which will be transmitted in subsequent scans across the page. The data from the first 16 photosensors is amplified and conditioned by the signal amplifier and conditioner of FIG. 2, and is transferred directly to the buffer and encoder of FIG. 2 through the "on line data" line. The data from the next 32 photosensing elements is amplified and conditioned by the amplifier and conditioner of FIG. 2 and transferred to the pre-scan analyzer. To provide the image location function, the pre-scan analyzer is set to detect the first and last appearance of any image data other than all white during the scan for groups 3 and 4 as well as groups 5 and 6. When data is all white across the page for all four pre-scan groups, as commonly occurs in the upper and lower margins, the pre-scan analyzer transfers a zero occurrence signal to the buffer and encoder during the interval between end of line and start of next line. The encoder transmits a double line feed signal to the receiver which increments the recording paper two-16 element space between lines. Since the pre-scanning information showed no image present, the print paper is commanded to skip two lines.

In the event that groups 3 and 4 were all white the same method would be used resulting in a transmitted signal indicating one single line feed in addition to the normal line feed between scans. If groups 3 and 4 show presence of an image, and groups 5 and 6 are all white, a special action is not initiated since groups 3 and 4 must be scanned normally and groups 5 and 6 will be pre-scanned again anyway.

It will be understood that special, line-advance signals are also transferred to the control logic, which activates the photosensor drive motor to move the photosensor assembly a corresponding number of line spacings before starting the next scan.

The foregoing description should adequately present the methods used to provide the first function of the pre-scanning and image analyzing so that it will be clearly understood by those skilled in the art.

The second function which will now be described is used when an image is detected in any one of the groups being pre-scanned. In this example, the sub-scan section width is 10 elements covering a distance of 1/10 of an inch. The scanning width on the page is selected to be 8.2 inches which results in 82 sub-scan sections across the page at the transmitter and the receiver. The control logic contains a 7 bit binary counter which resets to 1 at the beginning of each line. The count is increased by 1 for each indexing of the paper relative to the photosensor one sub-section width. Thus the counter has a count which indicates which of 82 positions on the page is being scanned. If no special condition occurs the count of 82 is used to initiate an end of line sequence.

During a scan, a first image appearance in the pre-scan data of groups 3 and 4 could occur in any one of the 82 positions. When the first image data is detected by the pre-scan analyzer, the scanning section count is transferred to a 7 bit memory called "first data-group 3, 4". At the same time, the count is transferred to another 7 bit memory called "last data-group e,4". Thereafter during the scan the count is transferred to the "last data" memory every time data is detected. At the end of a scan the "last data" memory will contain the count at the last time it was transferred which is the number of the section which contains the last data of the scan. At the same time the "first data" memory retains the number of the section containing first data. Additional 7 or 8 bit memory devices are used to store the same information for groups 5 and 6.

At the beginning of the next scan, a "first data" number is made a part of the start line code. As a result both the transmitter and the receiver can rapidly index or slew to the first position requiring scanning. The "last data" number is not transmitted but it is used by the transmitter to activate an end of line sequence as soon as scanning of that section is complete. The transmitter rapidly completes the line scan without transmission of additional data so that pre-scanning can be completed. The receiver may return to its start line position immediately.

The "first data" and "last data" for groups 5 and 6 are ignored unless groups 3 and 4 show no image content. Then the line containing 3 and 4 is skipped and "first data" and "1st data" numbers of group 5 and 6 are used as described above to start and end scanning at image containing sections.

The foregoing description presents the methods used to provide the second function of the pre-scanning and image analyzing so that it will be clearly understood by those skilled in the art.

Figure 16:
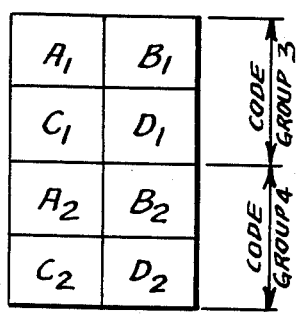
Figure 17:
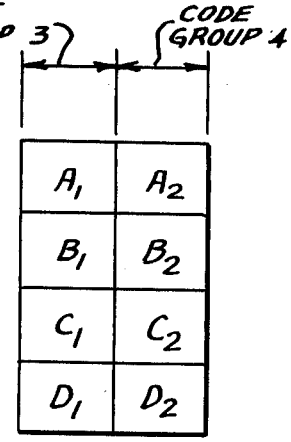
Figure 18:
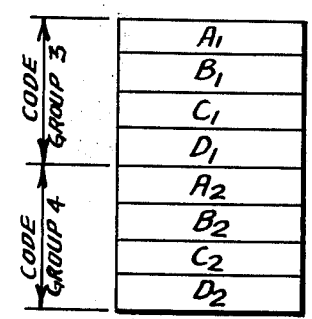

Referring now to FIGS. 16, 17 and 18 there is illustrated 3 configurations of scanning zones which will be used to describe the third function of pre-scanning and image analyzing. Each of the 3 scanning configurations contains two groups of four zones. FIG. 16 is a generally preferred configuration. However some documents or portions of documents will respond more favorably to vertically oriented arrangement of zones such as shown in FIG. 17. Other documents or portions of documents will respond more favorably to a horizontally oriented arrangement of zones such as shown in FIG. 18.

The third function of pre-scanning and image analyzing in accordance with this invention is provided by detecting redundant zone patterns of FIG. 16 for code groups 3 and 4 from pre-scan data. The redundant zone combinations of interest are listed in FIG. 11 along with code bits required and equivalent data bits transmitted. The difference between equivalent data bits transmitted and code bits required equals the transmission bits eliminated for each occurrence. The image analyzer contains circuitry for detecting the zone combinations listed and summing the total bits saved during the scan across the page. Additional circuitry is provided for summing total bits saved, using configurations of FIG. 17 and FIG. 18. A comparison of sums is used to generate a configuration signal which will cause the next line to be scanned in accordance with the 1 of 3 configurations which will produce maximum bit savings. The start line code will contain 2 bits of information to indicate to the receiver which configuration is to follow. The sub-scanning area covered by the transmitter and the receiver remains unchanged from line to line and the encoding and decoding circuitry is not changed. The above description refers to preferred pattern configurations for some classes of equipment and documents but it will be clearly understood by those skilled in the art that a technique has been provided for image analyzing of other desired configurations as well as the specific configurations described above.

It will also be understood that a parity check bit or bits can be added to the code groups for error correction in the same way that it is commonly done in other data transmission systems.

Specific applications of the above methods will now be described based on an understanding of the coding methods as set forth above, and will include an explanation of advantages in analog systems as well as digital systems. The data conditioner of FIG. 2 performs the function of a digitizer in a two level system where more levels of "gray scale" are not needed.

In a two level system, the code bits and the uncoded facsimile data bits are transmitted as one digital data stream. The separation of the codes is possible because the beginning of each code group contains a code, even if it is only a code which indicates that the group will be transmitted as uncoded facsimile data. After an equivalent of 80 facsimile elements have been transmitted the next code starts.

In an analog system the coding method of this invention is useful for still another reason. It will be understood that the codes do not contain specific information concerning the image density. The codes indicate redundancy in a zone of previous information whether it is white, black or gray or a mixture of levels in a horizontal or vertical mode.

A preferred embodiment of this invention will now be described using analog facsimile signals or video signals. It is preferable to select the number of gray scale levels that are adequate for useful transmission of the desired type of images. It will be understood from the following description that increasing the number of levels decreases the potential redundancy.

The number of gray levels required varies widely with the application, so the following description will refer to 4 levels as adequate for commercial communications but switchable to values from 2 to 8 levels of gray scale response.

The data conditioner shown in FIG. 2 is used for conditioning the analog signal. The signal from the photosensor representing image density is amplified and compared with 7 threshold levels during a controlled time period of 1 element. The output is 1 of 8 digital states of which 4 are not used when a 4 level transmission is to be made. The states of 1, 3, 5 and 7 are deactivated so that only the states of 9, 2, 4 and 6 are used. In this mode it will be understood the state of 0, for example, refers to a signal which is below the second threshold and that state 4, for example, is above threshold 4 but below 6. It will be also understood that activating the response to threshold levels 1, 3, 5 and 7 will provide a total of 8 levels being used. Also activating the response to only one of the threshold levels will result in a two level system.

In the example being described of a 4 level operation, a 3-bit code is generated according to the number of thresholds crossed by the signal during one element time. This 3 bit code is transferred to an "analog to digital" converter which produces an analog signal which has a vlue in the center of the range detected for the actual signal. The signal is filtered to match the bandwidth of the channel to be used. It will be understood that this is a 4 level representation of the input that is conditioned to indicate 1 of 4 states by its amplitude during a one element time period. It can be stored in memory and transferred in an analog buffer such as a "charge coupled" device. The system described above for the operation of FIG. 1 and 2 in the uncompressed part of the transmission continues to operate as it did with a binary input, provided the buffer components are capable of storing and transferring analog type data.

For purposes of providing data compression, the receiving buffer will store and use the previous line and previous column data. The amplitude of the analog data will be used to determine the "on" time per element of the ink jet shown in FIG. 1 or the "on" time of other printing devices used.

Methods for using the coding, as provided by this invention, in such an analog system will now be explained in more detail. It will be understood that a method closely related to the methods used in coding the digital data could be used. However a preferred method of encoding the analog data will be explained which requires that less detecting means be used since access to analog storage devices is not as easy for readings of the states of the data and since more states of the data must be determined.

Accordingly, a pre-scan of the code group is taken in accordance with this invention to determine the codable horizontal redundancy within the group. As will be shown, the vertical redundancy is easily determined during the data producing scan. To provide a fast code producing pre-scan and a data producing scan withint the time of the fastest group, it is preferred that the photosensor assembly shown in FIG. 2 by a 10×16 array of photosensors. The need for high speed indexing or reverse indexing is thus eliminated.

To determine the horizontal redundancy, the data from the previous column of the previous code group must be available for comparison. A preferred method is to store the 3 bit code described above which is generated for each element of the last column in the previous adjacent group. The pre-scan is arranged to scan the rows in sequence. The 3 bit data from each element of the pre-scan within each one row is compared in sequence as produced with the previous 3 bit data of that row. A constant 3 bit pattern for each of the rows in a zone as compared to the previous element as it occurs in the data stream will establish horizontal redundancy. It will be understood that this is true even though the gray level is different from one row to the next.

A normal data scan is arranged to scan the columns in sequence. This means that vertical redundancy can be detected by comparing the sequentially produced 3-bit patterns with the previous 3-bit data pattern. In accordance with this invention the redundant combinations of zones are encoded as shown in FIG. 9.

The codes are produced by inserting two level digital bits which can have an amplitude in excess of the analog data bits. In particular they can be made to have an amplitude beyond the full black level or full white level or both. The redundant facsimile signals which are replaced by the codes are rapidly shifted out of the transmitting buffer and dumped, so that non-redundant data can be transmitted in the appropriate sequence following the codes. It will be understood by those skilled in the art that the system described provides a method for transmitting multi-level data compressed facsimile signals utilizing the methods of this invention wherein the horizontal or vertical redundancy, or both, is efficiently coded for data compression purposes. It will also be understood that the multi-level transmission can be in the form of analog signals, or the 3 bit code can be carried forward into the transmission for an all digital multi-level system when desired.

FIGS. 19 thru 23 depict, in sequential form, various segments of circuitry useful in carrying out this invention, particularly, the encoding phase. These figures depict circuitry of one type useful in this connection, but is to be understood as only one among a number of designs which would so function effectively. Further, it should also be understood that although the particular logic system which this particular apparatus implements is a so-called "Transistor—transistor" or "TTL" logic, other "languages" might be utilized in the alternative. Further, it is also to be understood that the code system per se, as binary "plus" or "minus" bits, may be inverted either by the use of invertors of known per se design or, as in the case of the apparatus for which FIGS. 19 thru 23 depict circuitry, by the circuitry itself. Indeed, the configuration shown in FIGS. 19 thru 23 would result in such a "plus"—"minus" logic inversion of the signals hereinbefore described, and has been designed to demonstrate this fact and to illustrate how particular choices of circuit components might be more compatible inherently with such an inversion of code bits rather than with a non-inversion.

As previously described, in carrying out this invention, for example, a picture or a page of text is fastened to the scanning drum. The scanning drum is rotated by a stepping motor. This stepping motor operates in synchromism with a variety of specific clock pulses that are called out throughout the mechanization. It is to be understood that known per se clock and synchronization systems may be used thoughout. No design detail is shown for these elements as it is well known to provide the various rates and divisions of clock pulses.

A photosensor and illuminator array scans the picture or page. This array moves down the document by virtue of a motor driven lead screw. This lead screw turns in substantially exact synchronism with the drum stepping motor.

The photosensor array carries 48 sensor elements, as previously discussed. Only 17 of the elements are considered in this mechanization. 16 of the photosensors provide the current data that is being processed at the time. The seventeenth sensor is used to actually retract the path of the previous row.

As the drum steps, and the lights and darks of the lines and letters of the document are "seen" by the 16 active photosensors, a set of 16 serial bit streams are formed. These bit streams are converted into binary form and in this mechanization are made TTL logic compatable.

Since the scanning drum is rotated by a stepping motor, the bits may be exactly one circumferential step of the drum in length. The time duration of each bit directly depends upon the stepping speed of the drum drive motor.

The previous row is scanned again by the 17th photosensor. Its bit stream is used in a variety of ways to enhance the coding computations. The 16 active bit streams, as they are formed by the stepping action, can be divided up into scan zones. The scan zone division, for the purposes of this discussion, is taken to be that of FIG. 8. In this division, the previous row and the previous column are retained and the scan zones proper consist of four regions, A, B, C, D, that are 16 units in the vertical (16 photosensors) and 10 units in the horizontal (10 scanning steps). Thus each of the subzones, A, B, C, D are actually 8 units high and 5 units wide.

The 16 bits that are formed at each scan step are converted into a serial bit stream by using one or more Universal Synchronous/Asynchronous Receiver/Transmitter ("USART") circuits.

Figure 19:
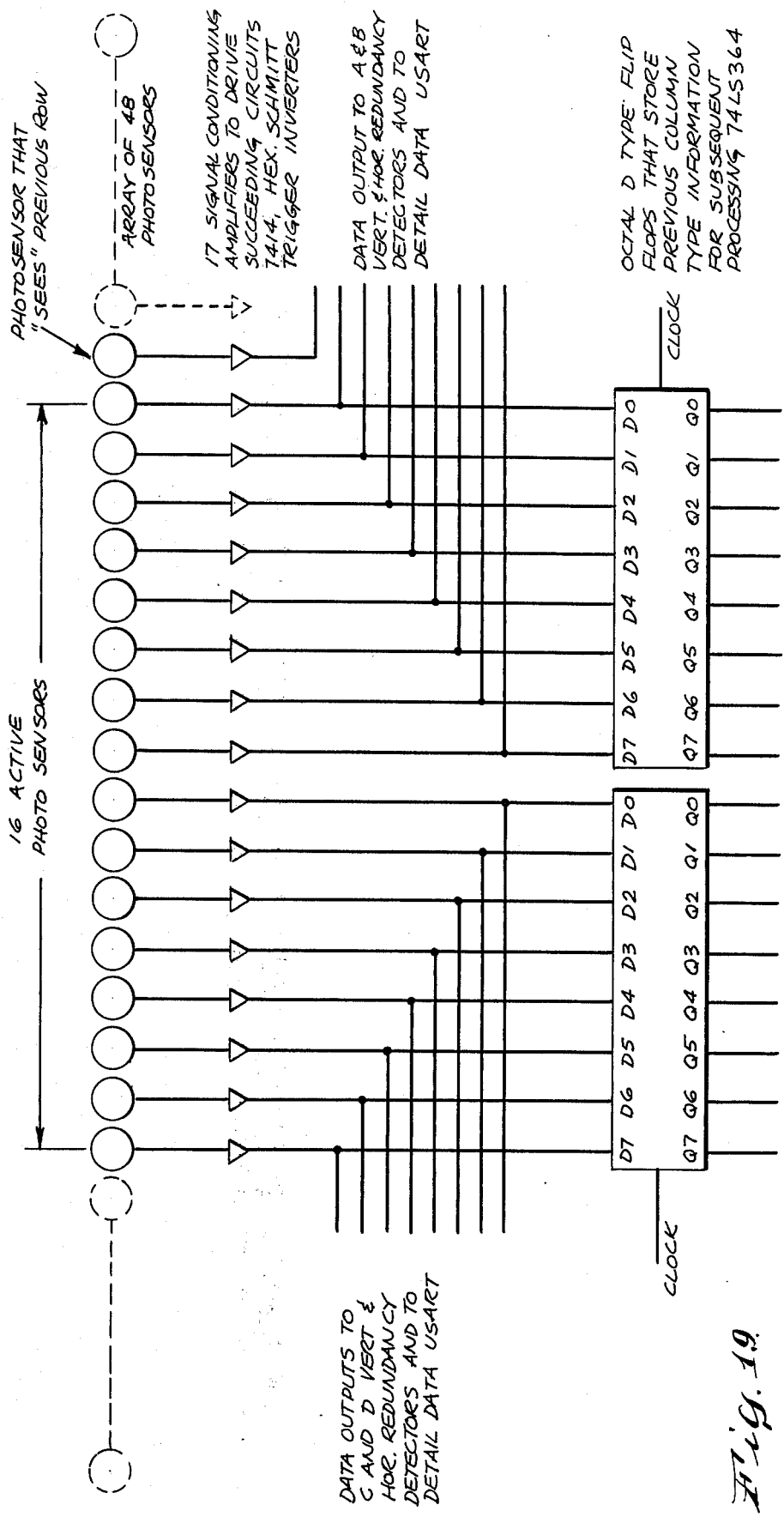
FIG. 19 is a schematic drawing of a portion of apparatus useful in carrying out the present invention.

Referring to FIG. 19, the seventeen photosensors are shown feeding a set of Hex Schmitt Inverter trigger circuits (e.g. 7414). These circuits condition the signals to convert them into TTL levels. Two sets of data are taken from these inverters to the A, the B, the C, and the D vertical and horizontal redundancy detector circiuts. The data streams also are directed into the D inputs of two Octal D-Type latches, where the data from the previous column is stored for horizontal redundancy reference.

Figure 20:
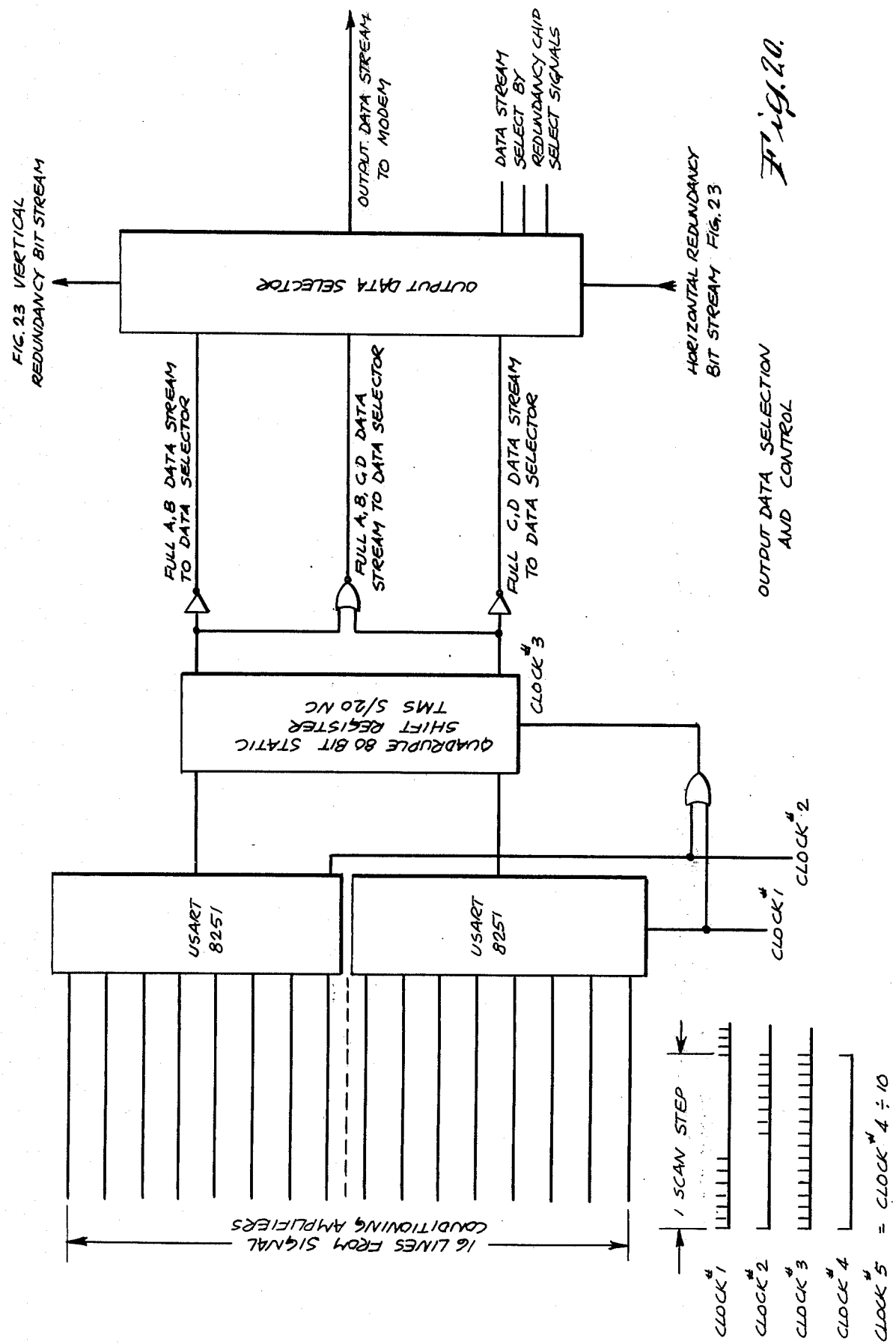
FIG. 20 is a schematic drawing of another portion of the apparatus of FIG. 19.

Referring to FIG. 20, 16 lines are brought to the USARTS, in two groups of 8. The top 8 bits are shown serialized first, being clocked by a train of pulses that are 16× the scan step rate. When the first 8 bits are encoded by the top USART, the next 8 bits may be encoded by the bottom USART, on a phase #1-phase #2 basis. The two clock pulse trains are "OR'd" together to provide a clocking signal for a necessary storage device.

It is necessary that the bit streams formed by the two USARTS be held in storage until the entire A, B, C, D code group has been scanned. Once this has been done, the data streams can then be used as necessary, there being no valuable redundancy of which advantage can be taken. A TMS 3120 shift register is suited for this purpose. It is a quadruple 80 bit register, and two sections can be connected to serve each USART. Thus the A,B uncoded data stream appears at the top section of the shift register, and the C,D uncoded data stream appears at the bottom pair of shift registeres. These two data streams are "OR'd" together to produce the uncoded total bit stream, named: A,B,C,D, uncoded.

These three bit streams are connected to the output data selector. The Horizontal Redundancy bit streams and the Vertical Redundancy bit streams are also connected to this data selector. When any appreciable and useful amount of vertical or horizontal redundancy exists, these bit streams, which are highly encoded, are selected by the redundancy chip select signals which are shown to be generated in FIG. 23. When only A,B redundancy is detected, the C,D uncoded bit stream is selected for transmission. When C,D redundancy is detected, the A,B uncoded bit stream is selected for transmission. And again, if no redundancy is detectable, the A,B,C,D uncoded bit stream is selected for transmission.

It is to be noted that no framing or synchronizing signals are shown being assembled and transmitted with the output data streams, as these details are sufficiently routine that no elaboration upon them is deemed necessary.

Figure 21:
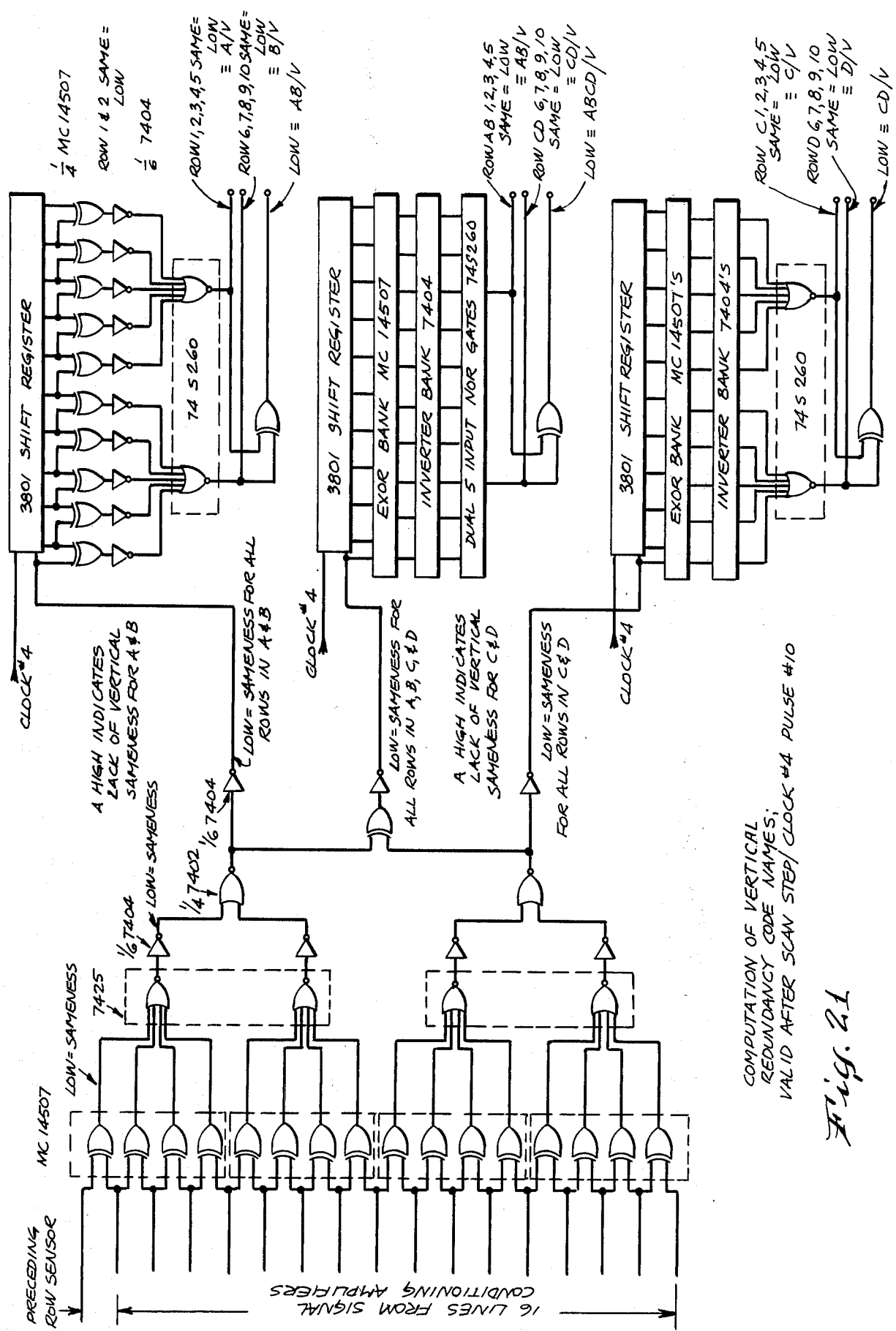
FIG. 21 is a schematic drawing of another portion of the apparatus of FIGS. 19 and 20.

FIG. 21 illustrates, in detail, how the vertical redundancy codes may be generated from the vertical array of photosensor signals. The signal from the previous row is also used in this circuit, as a reference for the determination of "Sameness" (redundancy).

An EXOR circuit is used in this circuit to determine "Sameness" in the vertical dimension. This logic element, available in many forms, (p.g., Motorola MC14507, for example) has two inputs. When both inputs are the same. either 0 or 1, the output is 0. If either of the two inputs is different, the output of the circuit goes "High". Thus the determination of "sameness" in the vertical dimension is computed by 4 integrated circuits of the MC14507 type. The outputs are OR'd together by # 7425 integrated circuits. As shown in the figure, these are grouped to coincide with the top and bottom 8 bit pairs, defined in the scan zones.

It is now necessary to store the determinations of "Sameness" (or lack thereof) in three 10-step shift-registeres, such as a Fairchile #3801. At each step of the scan motor, the data is caused to step across the shift registers, until at the 10th step, the registers are filled. At this time a valid determination of vertical redundancy or "Sameness" may be made for the entire scan zone by using the EXOR circuits again. This time they are "NOR'd" together in 5 input NOR gates (e.g. #74S260), to represent the difference in the A versus B, and the C versus D, scan zones.

Thus the basic code names for vertical redundancy are formed from the three bit streams that are stored in the shift registers. The A/V code and the B/V code lines are low, as long as vertical redundancy exists for every scan position, 1–5 for A and 6–10 for B. AB/V is formed by taking the EXOR output from these two codes. If either one of them were to "High", it would indicate that no vertical redundancy could be obtained there, and the uncoded data stream would have to be called for, at the output data selector.

Likewise, the bottom shift register and EXOR net computes the C/V, the D/V and the CD/V redundancy codes.

At the same time the middle codes are formed by EXOR computations of the top and the bottom signals. Thus, it is seen that AB/V, CD/V are formed again, and that the combination of these forms the ABCD/V code.

These codes are used as shown in FIG. 23 to form all the rest of the redundacy codes by using various EXOR logic combinations of these basic signals.

Figure 22:
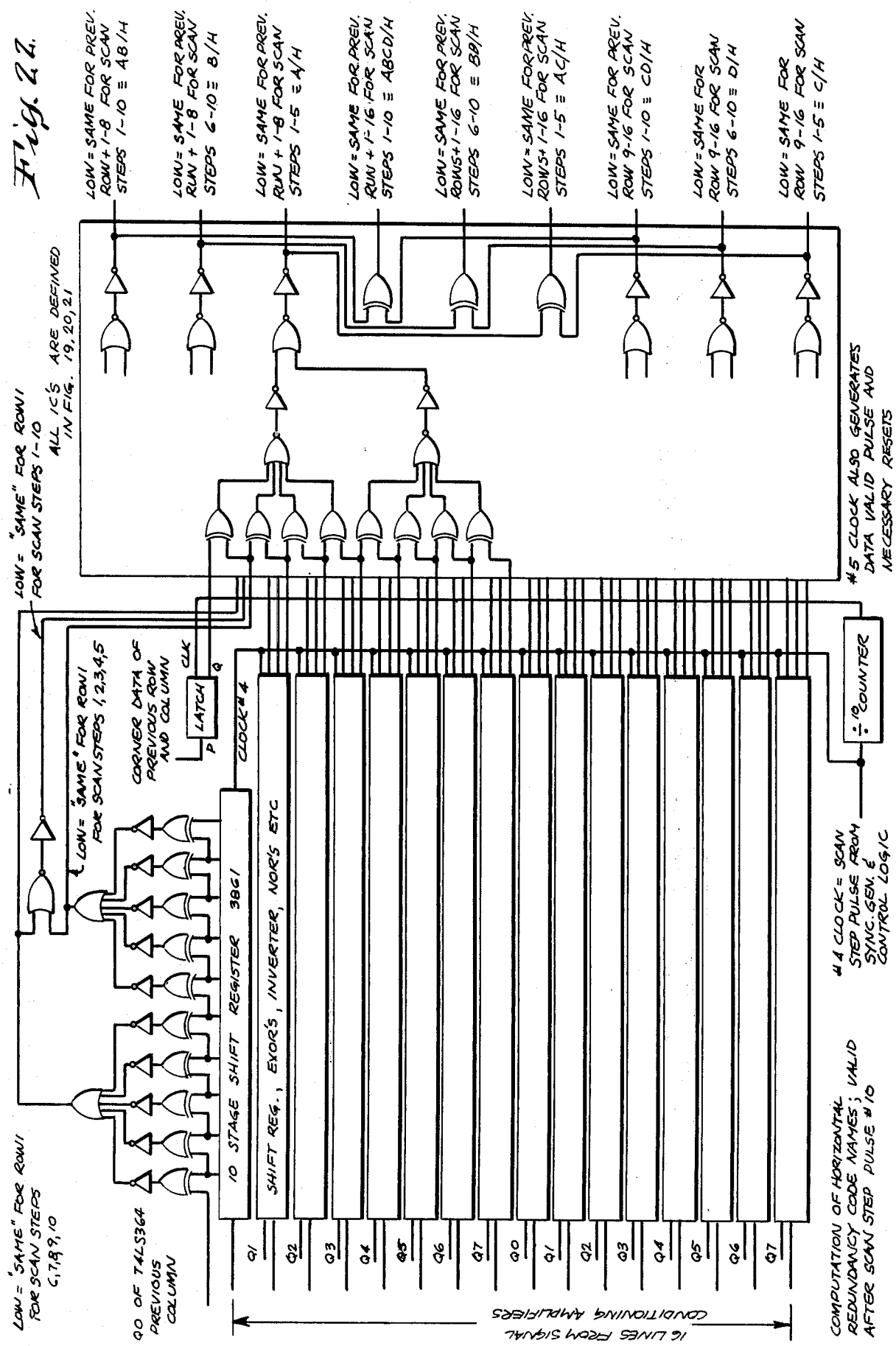
FIG. 22 is a schematic drawing of another portion of the apparatus of FIGS. 19 thru 21.

FIG. 22 depects the computation of the Horizontal redundancy code names. This computation starts from the previous column signals that were stored in the latches, seen in FIG. 19. In this case, all 16 bit streams, that are formed by the scan step motor, are stored in 16 type 3801 10-bit shift-registers. The outputs of the shift registers, at every station, are compared, one with the next (including the reference previous column) by the use of EXOR circuits. Thus, at the output of the EXOR circuits, the low logic level means "Sameness" in the horizontal dimension. These EXOR signals are combined by inverters and 5 input NOR gates to divide the scan zones into the A versus B regions.

Out of each Shift Register/EXOR/OR combination, comes 3 signal lines. Any one of these lines is the "Sameness" determination for row n, at steps 1,2,3,4,5. The basic signal is the "sameness" determination for the same row "n" for scan steps 6,7,8,9 and 10. Combining these two signal lines with a NOR function (OR) gives the "Sameness" determination for row "n" for all scan steps 1 through 10. This determination is not valid until 10 steps are scanned.

The row information, containing the basic "Sameness" data for the first 5 scan steps, the second five scan steps and the full 10 scan steps, may be combined vertically to yield "Sameness" data for the code names A/H, B/H, C/H, and D/H. Using combination of EXOR logic, the various combinations such as AB/H, and CD/H can be readily formed as shown. All other combinations of the redundancy code names may be formed in a like manner and this is shown in FIG. 23.

As it is necessary to recall the corner bit which is common to both the previous row and previous column, this circuit is shown in FIG. 4, as a latch that is clocked by a divide by 10 counter and driven from the ubiquitouts 17'th opto-sensor.

FIG. 23 shows the aggregate of all the redundancy code generation lines, used to form the various signals that select the data streams involved. EXOR logic is used to obtain all the redundancy codes from the basic determinations of the previous figures. These codes, which are in reality either high or low levels that appear after the 10th scan step, at these various ports. Both the vertical set and the horizontal set are directed to data selectors (e.g., #74150) which act as 16 position digitally controlled switches. These switches are scanned by the decoded outputs of two counters (e.g. #74161). When each counter steps, the output binary work increments one digit and the switch advances one step. The redundancy codes are to be connected to the ports of this data selector in a defined priority order. Thus, as long as "Sameness" is determined, the switch keeps scanning until a lack of "Sameness" appears. When one step of the switch shows a "High", the switch stops scanning, and the digital code of this particular switch position gives the input data for a look-up table to form the redundancy code that is to be transmitted.

This is accomplished in the following manner. At the output of each 16 position data selector, a D type flip flog (latch) is connected. This flip flop is clocked every time the switch is stepped. The "0" output of the flip flop thus contains the previous redundancy code value, either a "0" for "Sameness" or a "1". As long as the D and the Q output of this flip-flop latch are at "0" level, the switch is scanning "Sameness" codes and the stepping continues. If one step comes up with a "1", indicating a breakdown in "Sameness", the D and the Q output of the latch will differ and the EXOR circuit seeing this will go high. This high will be inverted and will take the clock selector NAND gate low, thus stopping the switch action.

The binary code of the particular switch is then directed to a Programmable Read Only Memory ("PROM") (e.g. #74S288). This code, plus the "Q" output of the latch is used to determine the exact digital code that is to be sent to the output data selector.

Chip select data is also drawn from the "D" output of the latch to turn on the PROM when the switch has stopped scanning. This signal is likewise used to define the bit stream that will be transmitted from the output data selector.

The scanning rate of the redundancy detection data selector must be faster than the other clock rates. All 16 lines must be scanned in a time that is short compared to a scan step. It is suggested that this rate be at least twice the scan rate that is used to clock the ouput data USARTS.

Two USARTS are seen feeding data from the PROMS to the output data selector. These are clocked in a two phase manner, identical with the two USARTS that derive the uncoded data for transmission.

This, in summary, it is seen that the document is scanned by an optical sensor system that is stepped across the page. The scan zone is defined and is broken up into small regions, which are given code letter designations. Various logic proceses are applied to show the presence of horizontal as well as vertical sameness or redundancy in the signals that are developed. These redundancy codes are arranged in some prioroity order and they are then scanned sequentially. As long as redundancy exists, the scanning continues. When lack of "Sameness" of the image is noticed, this code selection stops and this code is directed to the output circuits where it is combined with suitable framing and synchronizing signals and is transmitted to a receiver.

At the receiver, a reverse process is applied, as will be obvious to those with ordinary skills in this cognizant arts from the foregoing and when lack of "Sameness" is detected, the image is converted from white to black (or the reverse) by a knowledge of the position of the scanner and the redundancy code position.

It is to be understood that the embodiments herein described and illustrated are by way of illustration and not of limitation, and that other embodiments may be practices without departing from the spirit or scope of this invention.

I claim:

1. A method of preparing data bit information descriptive of information imagery for transmission to data bit receiver print-out apparatus comprising the steps of subdividing a portion at least of the surface which contains the imagery to be transmitted into at least one zone, each of which corresponds in configuration and area to the configuration and area of a different one among the characters in an associated receiver print-out apparatus, further subdividing said zones into a matrix of image elements described by a plurality of rows and of columns, and rendering into data bit form suitable for transmission to and reproduction by said associated receiver print-out apparatus, information descriptive of the characteristics of the image elements in each of said zones by establishing data bit information describing the image characteristics for a row reference series of image elements for each of said scan zones, each of which elements corresponds positionally and in the dimension thereof which is in the direction of orientation of said columns to the image elements comprising one of said rows of said scan zone, establishing data bit information describing the image characteristics for a column reference series of image elements, for each of said scan zones, each of which elements corresponds positionlly and in the dimension thereof which is in the direction of orientation of said rows to the image elements comprising one of said columns of said scan zone, establishing data bit information for describing the image characteristics of all of the image elements in each of said scan zones, making a first comparison of the data bit information for each image element in each row in each of said scan zones with the data bit information for the image element in the row reference series corresponding to each row in said scan zone, and with respect to every one of said zones as to which, for all rows therein, said first comparision reveals complete redundancy of all of the image elements in each such row with the image element in said row reference series corresponding to said row, encoding a distinctive code signal to indicate this fact, and with respect to every one of said zones as to which said first comparison does not reveal such complete redundancy, making a second comparison of the data bit information for each image element in each column in each of said scan zones with the data bit information for the image element in the column reference series corresponding to each such column, and with respect to every one said zones as to which, for all columns therein, said second comparison reveals complete redundancy of all image elements in each such column with the image element in said column reference series corresponding to said column, encoding a distinctive code signal to indicate this fact, and with respect to every one of said zones as to which said second comparison does not reveal complete redundancy of all image elements in each such column with the image element in said column reference series corresponding to said column, encoding a distinctive signal to indicate that fact, and, with respect to every one of said zones as to which neither said first comparison nor said second comparison reveals complete redundancy as aforesaid, compiling data bit information descriptive of the characteristics of each of the image elements in said zone.

2. The method described in claim 1 wherein said step of establishing data bit information describing the image characteristics for at least one of said row reference series of image elements comprises the step of reproducing the data bit information describing the image characteristics of a column in a previously scanned zone.

3. the method described in claim 1 wherein said step of establishing data bit information describing the image characteristics for at least one of said row reference series of image elements comprises the step of reproducing the data bit information describing the image characteristics of a column in a previously codified scan zone, and wherein said step of establishing dat bit information describing the image characteristics for said column reference series of image elements for making said second comparison in the same zone as that in which said row reference series is to be used to make said first comparison comprises the step of reproducing the data bit information describing the image characteristics of a row in a previously codified scan zone.

4. The method described in claim 3 wherein said subdivision steps comprise scanning the surface of the medium withint the confines of each of said zones.

5. The method described in claim 1 wherein said step of rendering said information into data bit form comprises rendering said information into the form of an analog data.

6. The method described in claim 1 wherein said subdivision steps comprise scanning the surface of the medium within the confines of each of said zones.

7. A method of encoding images which are on a two-dimensional base into data for transmission via an image data transmission system comprising the steps of selecting a portion at least of said base as a scan zone, subdividing said scan zone into a matrix of image elements described by a multiplicity of rows in one direction, and into a multiplicity of columns in another direction.

establishing data bit information describing the image characteristics for a row reference series of image elements, each of which elements corresponds, with respect to one of said rows, in sequential position and in dimension taken in the direction of said columns.

establishing data bit information describing the image characteristics for a column reference series of image elements, each of which elements corresponds, with respect to one of said columns, in sequential position and in dimension taken in the direction of said rows, making a first comparison in one of said directions, of each of the rows or columns (as the case may be) in said direction with the reference image elements corresponding to each, and if all image elements so compared are found to be identical with their respective corresponding image elements, codifying a distinctive code signal to indicate this fact, but if they do not, making a second comparison in the other of said directions of each of the rows or columns (as the case may be) in said other direction with the reference image elements corresponding to each, and if all image elements so compared are found to be identical with their respective corresponding image elements, codifying a distinctive code signal to indicate this fact, but if such identity is not found from either of said comparisons, compiling data bit information descriptive of the characteristics of each of the image elements in said zone.

8. The method described in claim 7 wherein said step of establishing data bit information describing the image characteristics for said row reference series of image elements comprises the step of reproducing the data bit information describing the image characteristics of a column in a previously scanned zone.

9. The method described in claim 7 wherein said step of establishing data bit information describing the image characteristics for said column reference series of image elements comprises the step of reproducing the data bit information describing the image characteristics of a row in a previously scanned zone.

10. The method described in claim 7 wherein said step of establishing data hit information describing the image characteristics for siad row reference series of image elements comprises the step of reproducing the data bit information describing the image characteristics of a column in a previously codified scan zone, and wherein said step of establishing data bit information describing the image characteristics for said column reference series of image elements comprises the step of reproducing the data bit information describing the image characteristics of a row in a previously codified scan zone.

11. The method described in claim 7 wherein said step of establishing data bit information describing the image characteristics for said row reference series of image elements comprises the step of reproducing the data bit information describing the image characteristics of the column in the previously codified scan zone next adjacent to the first row of said scan zone to be scanned.

12. The method described in cliam 7 wherein said step of establishing data bit information describing the image characteristics for said column reference series comprises the step of reproducing the data bit information describing the image characteristics of the row in the previously codified scan zone next adjacent to the first column of said scan zone to be scanned.

13. The method described in claim 7 wherein said step of establishing data bit information comprises describing the image characteristics for said row.

14. The method described in claim 7 wherein said step of rendering said information into data bit form comprises rendering said information into the form of analog data.

15. The method described in claim 10 wherein said step of rendering said information into data bit form comprises rendering said information into the form of analog data.

* * * * *